United States Patent
Park (10) Patent No.: US 9,477,612 B2
(45) Date of Patent: Oct. 25, 2016

(54) MEMORY SYSTEM FOR RELIABLE PREDICTED SEQUENTIAL READ OPERATION

(71) Applicant: SK hynix Inc., Gyeonggi-do (KR)

(72) Inventor: Jeen Park, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 14/718,908

(22) Filed: May 21, 2015

(65) Prior Publication Data

US 2016/0179697 A1 Jun. 23, 2016

(30) Foreign Application Priority Data

Dec. 19, 2014 (KR) ........................ 10-2014-0184826

(51) Int. Cl.
*G06F 12/00* (2006.01)
*G06F 12/10* (2016.01)

(52) U.S. Cl.
CPC ....... *G06F 12/1009* (2013.01); *G06F 12/1027* (2013.01); *G06F 12/10* (2013.01); *G06F 2212/65* (2013.01); *G06F 2212/68* (2013.01)

(58) Field of Classification Search
CPC .......................... G06F 12/10; G06F 12/1009
USPC ................................................. 711/202, 206
See application file for complete search history.

(56) References Cited

U.S. PATENT DOCUMENTS

2012/0072644 A1* 3/2012 Asano et al. .................. 711/103
2012/0159072 A1* 6/2012 Hida et al. .................... 711/119
2015/0154118 A1* 6/2015 Marcu et al. ................. 711/206

FOREIGN PATENT DOCUMENTS

KR 1020100130007 12/2010

* cited by examiner

*Primary Examiner* — Than Nguyen
(74) *Attorney, Agent, or Firm* — IP & T Group LLP (57) ABSTRACT

A memory system includes a plurality of memory chips each including memory regions and page buffers; an address table suitable for storing mapping information for mapping physical addresses and logical addresses; a target table suitable for storing sequential physical addresses and sequential logical addresses; a selective output block suitable for selecting the memory regions as pages under selection by units of a page according to a preset order, based on the sequential physical addresses, and outputting data stored in page buffers of memory chips under selection corresponding to the pages under selection; and an expected read block suitable for reading data stored in selection-expected pages, which is to be selected following the pages under selection according to the preset order, to store in page buffers of selection-expected memory chips corresponding to the selection-expected pages, while the data stored in the page buffers under selection are outputted.

20 Claims, 6 Drawing Sheets

MEMORY SYSTEM FOR RELIABLE PREDICTED SEQUENTIAL READ OPERATION

CROSS-REFERENCE TO RELATED APPLICATION

The present application claims priority under 35 U.S.C. §119 to Korean Patent Application No. 10-2014-0184826, filed on Dec. 19, 2014, the disclosure of which is incorporated herein by reference in its entirety.

TECHNICAL FIELD

Various embodiments of the present invention relate to a semiconductor design technology and, more particularly, to a memory system including a nonvolatile memory device.

DISCUSSION OF THE RELATED ART

Semiconductor memory devices included in a data storage system are generally divided into volatile memory devices and nonvolatile memory devices.

A volatile memory device may perform write and read operations at high speed, but its data stored is lost without power. On the other hand, in a nonvolatile memory device, the stored data is retained even without power. However, write and read speeds are relatively slow. Therefore, to retain stored data regardless of whether there is a constant power source, a nonvolatile memory device is used. A read only memory (ROM), a mask ROM (MROM), a programmable ROM (PROM), an erasable programmable ROM (EPROM), an electrically erasable programmable ROM (EEPROM), a flash memory, a phase change random access memory (PRAM), a magnetic RAM (MRAM), a resistive RAM (RRAM), and a ferroelectric RAM (FRAM) are examples of nonvolatile memory devices. Additionally, flash memories may be classified into NOR and NAND types.

Flash memories have advantages of RAM, in that program and erase operations may be freely performed, as well as advantages of ROM, in that the stored data may be retained even without power. Flash memories are widely used as the storage media of portable electronic appliances such as digital cameras, personal digital assistants (PDAs) and MP3 players.

Therefore, reliability of data in memory storage systems is regarded as an important issue.

SUMMARY

Various embodiments of the present invention are directed to a memory system that provides a reliable predicted read operation in a sequential read operation.

In an embodiment, A memory system may include: a plurality of memory chips each including memory regions and page buffers; an address table suitable for storing mapping information for mapping physical addresses for identifying the memory regions of the plurality of respective memory chips by unit of a physical page and logical addresses for identifying the memory regions of the plurality of respective memory chips by the unit of a logical page; a target table suitable for storing sequential physical addresses that are converted from sequential logical addresses through the address table; a selective output block suitable for selecting the memory regions of the memory chips as pages under selection by units of a page according to a preset order, based on the sequential physical addresses, and outputting data stored in page buffers of memory chips under selection corresponding to the pages under selection, among the memory chips; and an expected read block suitable for reading data stored in selection-expected pages, which is to be selected following the pages under selection according to the preset order in the selective output block, to store in page buffers of selection-expected memory chips corresponding to the selection-expected pages, among the memory chips, while the data stored in the page buffers of the memory chips under selection are outputted.

In an embodiment, A method for operating a memory system including a plurality of memory chips each having memory regions and page buffers, and an address table storing mapping information for mapping physical addresses and logical addresses for identifying the memory regions of the plurality of respective memory chips by the unit of a physical page and by the unit of a logical page, the method comprising: storing sequential physical addresses, which are mapped as sequential physical addresses through the address table, in a target table; selecting the memory regions of the memory chips, as pages under selection, by units of a page according to preset order, based on the sequential physical addresses; outputting data stored in page buffers of memory chips under selection corresponding to the pages under selection, among the memory chips; and reading, during the outputting of the data, data stored in selection-expected pages, which is to be selected following the pages under selection according to the preset order in the selecting of the memory regions, to store in page buffers of selection-expected memory chips corresponding to the selection-expected pages, among the memory chips.

DETAILED DESCRIPTION

Various embodiments will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts in the various figures and embodiments of the present disclosure.

It is also noted that in this specification, "connected/coupled" refers to one component not only directly coupling another component, but also indirectly coupling another component through an intermediate component. In addition, a singular form may include a plural form as long as it is not specifically mentioned.

Figure 1:
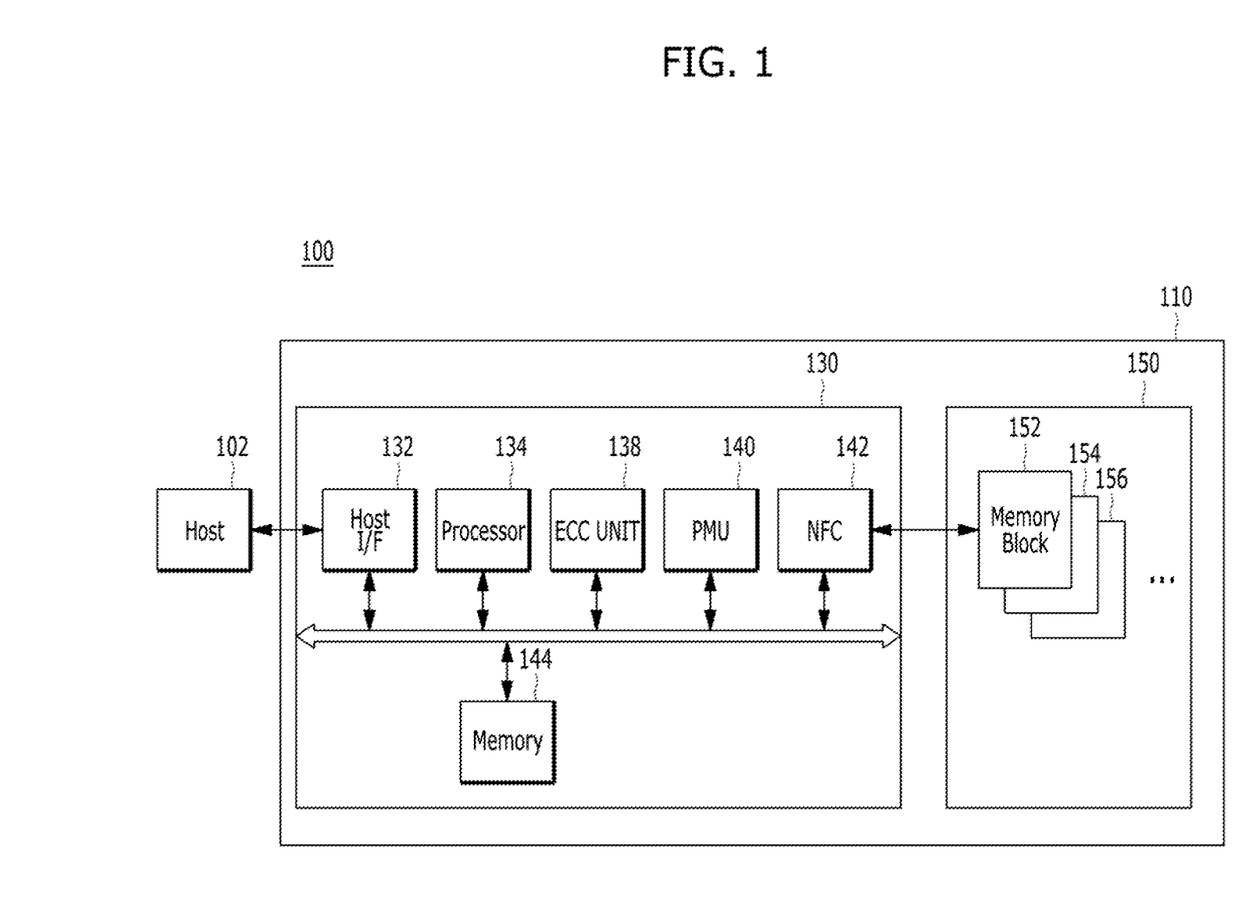
FIG. 1 is a block diagram illustrating a data processing system including a memory system.

FIG. 1 is a block diagram illustrating a data processing system 100 including a memory system.

Referring to FIG. 1, the data processing system 100 may include a host 102 and a memory system 110.

The host 102 includes, for example, a portable electronic device such as a mobile phone, an MP3 player and a laptop computer or an electronic device such as a desktop computer, a game player, a TV and a projector.

The memory system 110 operates in response to a request from the host 102, and in particular, stores data to be accessed by the host 102. In other words, the memory system 110 may be used as a main memory or an auxiliary memory of the host 102. The memory system 110 may be realized as any one of various kinds of storage devices, according to the protocol of a host interface to be electrically coupled with the host 102. For example, the memory system 110 may be realized as any one of various kinds of storage devices such as a solid-state drive (SSD), a multimedia card in the form of an MMC, an embedded MMC (eMMC), a reduced size MMC (RS-MMC) and a micro-MMC, a secure digital card in the form of an SD, a mini-SD and a micro-SD, a universal serial bus (USB) storage device, a universal flash storage (UFS) device, a compact flash (CF) card, a smart media card, a memory stick, and so forth.

The storage devices forming the memory system 110 may be realized as a volatile memory device such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), an ferroelectric random access memory (FRAM), a phase change RAM (PRAM), a magnetic RAM (MRAM) and a resistive RAM (RRAM).

The memory system 110 includes a memory device 150. The memory device 150 stores data to be accessed by the host 102, and a controller 130 which controls the memory device 150 to store data.

The controller 130 and the memory device 150 may be integrated into one semiconductor device. For instance, the controller 130 and the memory device 150 may be integrated into one semiconductor device to form an SSD. When the memory system 110 is used as the SSD, the operation speed of the host 102, which is electrically coupled with the memory system 110, may be significantly increased.

The controller 130 and the memory device 150 may be integrated into one semiconductor device and to form a memory card.

For example, the controller 130 and the memory card may be integrated into one semiconductor device to form a memory card such as a personal computer memory card international association (PCMCIA) card, a compact flash (CF) card, a smart media card in the form of an SM and an SMC, a memory stick, a multimedia card in the form of an MMC, an RS-MMC and a micro-MMC, a secure digital card in the form of an SD, a mini-SD, a micro-SD and an SDHC, and a universal flash storage (UFS) device.

Furthermore, the memory system 110 may form a computer, an ultra mobile PC (UMPC), a workstation, a netbook, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, storage for a data center, a device capable of transmitting and receiving information under a wireless environment, one of various electronic devices for a home network, one of various electronic devices for a computer network, one of various electronic devices for a telematics network, an RFID device, or one of various component elements for a computing system.

The memory device 150 may retain stored data even when power is blocked, store the data provided from the host 102, through a write operation, and provide the stored data to the host 102, through a read operation. The memory device 150 may include a plurality of memory blocks 152, 154 and 156. Each of the memory blocks 152, 154 and 156 includes a plurality of pages. Each of the pages includes a plurality of memory cells to which a plurality of word lines are electrically coupled. The memory device 150 may be a nonvolatile memory device, for example, a flash memory. The flash memory may have a 3D stacked structure.

The controller 130 of the memory system 110 controls the memory device 150 in response to a request from the host 102. For example, the controller 130 provides the data read from the memory device 150, to the host 102, and stores the data provided from the host 102, in the memory device 150. To this end, the controller 130 controls the operations of the memory device 150, such as read, write, program and erase operations.

In detail, the controller 130 may include a host interface (I/F) unit 132, a processor 134, an error correction code (ECC) unit 138, a power management unit (PMU) 140, a NAND flash controller (NFC) 142, and a memory 144. The controller 130 further includes a protocol unit (not Illustrated).

The host interface unit 132 processes the commands and data of the host 102, and may communicate with the host 102 through at least one of various interface protocols such as a universal serial bus (USB), a multimedia card (MMC), a peripheral component interconnect-express (PCI-E), a serial attached SCSI (SAS), a serial advanced technology attachment (SATA), a parallel advanced technology attachment (PATA), a small computer system interface (SCSI), an enhanced small disk interface (ESDI), and integrated drive electronics (IDE).

The ECC unit 138 detects and corrects an error included in the data read from the memory device 150 when reading the data stored in the memory device 150. That is to say, after performing error correction decoding for the data read from the memory device 150, the ECC unit 138 may determine whether the error correction decoding has succeeded, output an indication signal according to a determination result, and correct an error bit of the read data by using the parity bit generated in an ECC encoding process. The ECC unit 138 may not correct error bits if error bits occur in a number equal to or greater than a threshold number of correctable error bits, and may output an error correction fall signal meaning that it is incapable of correcting error bits.

The ECC unit 138 may perform error correction by using a low density parity check (LDPC) code, a Bose-Chaudhuri-Hocquenghem (BCH) code, a turbo code, a Reed-Solomon code, a convolution code, a recursive systematic code (RSC), a trellis-coded modulation (TCM) or a block coded modulation (BCM). The ECC unit 138 may include all circuits, systems or devices for error correction.

The NFC 142, as a memory interface between the controller 130 and the memory device 150 allows the controller 130 to control the memory device 150 in response to a request from the host 102, generates control signals for the memory device 150 and processes data according to the control of the processor 134, when the memory device 150 is a flash memory (e.g., a NAND flash memory).

The memory 144, as the working memory of the memory system 110 and the controller 130, stores data for driving of the memory system 110 and the controller 130. Specifically, when the controller 130 controls the memory device 150 in response to a request from the host 102. For example, when the controller 130 provides the data read from the memory device 150 to the host 102, and stores the data provided from the host 102, in the memory device 150, and, to this end, when the controller 130 controls the operations of the memory device 150, such as read, write, program and erase operations, the memory 144 stores data needed to allow such operations to be performed between the controller 130 and the memory device 150.

The memory 144 may be formed by a volatile memory such as a static random access memory (SRAM) or a dynamic random access memory (DRAM). As described above, the memory 144 stores data needed to perform data read and write operations between the host 102 and the memory device 150 and data with which the data read and write operations are performed. For such storage of data, the memory 144 may include a program memory, a data memory, a write buffer, a read buffer, a map buffer, and so forth.

The processor 134 controls the general operations of the memory system 110, and controls a write operation or a read operation for the memory device 150, in response to a write request or a read request from the host 102. The processor 134 drives firmware, referred to as a flash translation layer (FTL), to control the general operations of the memory system 110. The processor 134 may be formed of a microprocessor or a central processing unit (CPU).

The protocol unit stores and manages protocols for the controller 130 to control the memory device 150 in response to a request from the host 102. The PMU 140 provides and manages power for the controller 130.

Figure 2:
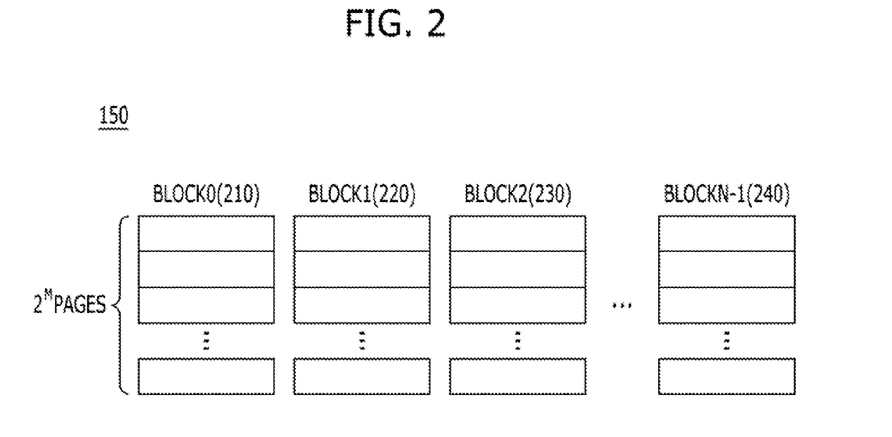
FIG. 2 is a detailed diagram of a memory device in a memory system shown in FIG. 1.

FIG. 2 is a detailed diagram of the memory device 150 shown in FIG. 1.

Referring to FIG. 2, the memory device 150 includes a plurality of memory blocks, for example, a zeroth block (BLOCK0) 210, a first block (BLOCK1) 220, a second block (BLOCK2) 230 and an N-1$^{th}$ block (BLOCKN-1) 240. Each of the blocks 210, 220, 230 and 240 includes a plurality of pages, for example, 2$^M$ number of pages (2$^M$ PAGES). While it is described for the sake of convenience that each of the memory blocks includes 2$^M$ number of pages, it is to be noted that each of the memory blocks may include M number of pages. Each of the pages includes a plurality of memory cells to which a plurality of word lines are electrically coupled.

Each of the memory blocks 210, 220, 230 and 240 stores the data provided from the host device 102, through a write operation, and provides the stored data to the host 102, through a read operation.

Figure 3:
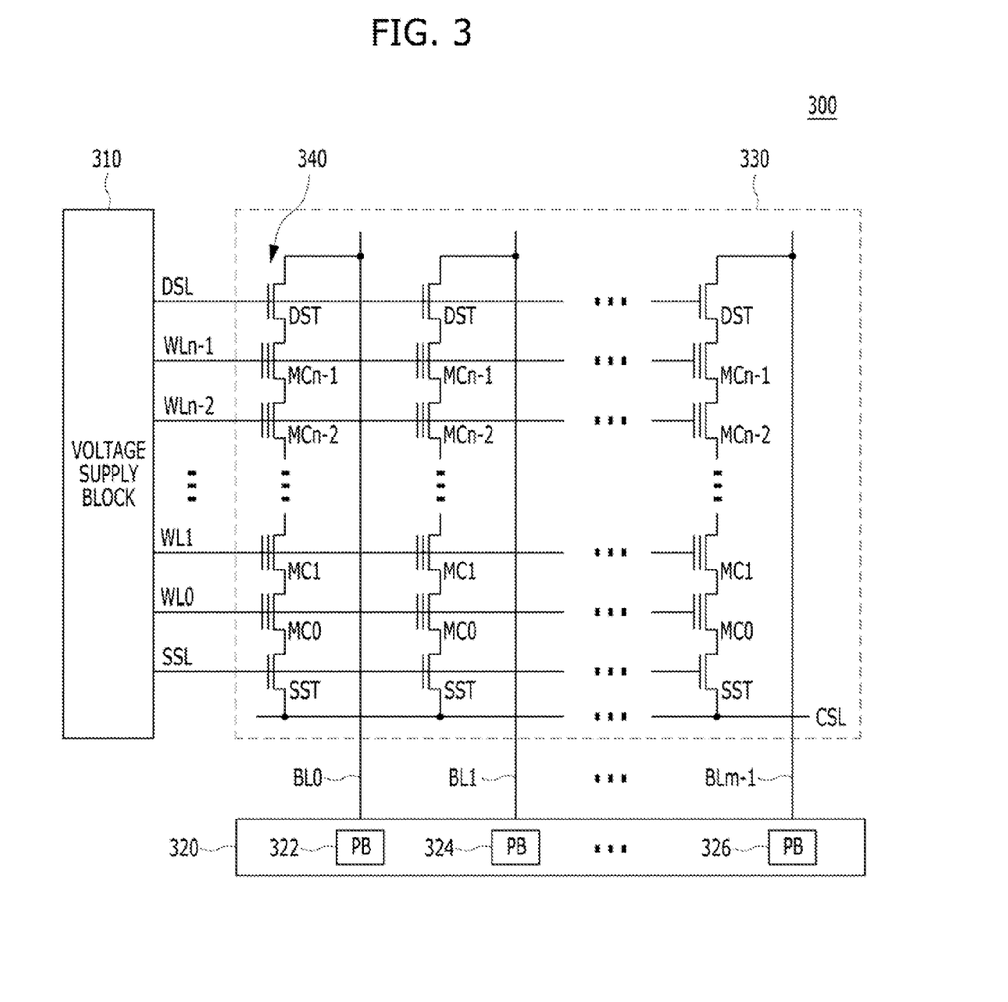
FIG. 3 is a detailed diagram of a memory device including a memory block shown in FIG. 2.

FIG. 3 is a detailed diagram of a memory device 300 including the memory block shown in FIG. 2. FIG. 3 shows a memory cell array circuit of the memory device 300.

Referring to FIG. 3, in the memory system 110, a memory block 330 of a memory device 300 may include a plurality of cell strings 340 which are electrically coupled to bit lines BL0 to BLm-1, respectively. The cell string 340 of each column may include at least one drain select transistor DST and at least one source select transistor SST. A plurality of memory cell transistors MC0 to MCn-1 may be electrically coupled in series between the select transistors DST and SST. The respective memory cells MC0 to MCn-1 may be comprised of multi-level cells (MLC), each of which stores data information of a plurality of bits. The strings 340 may be electrically coupled to corresponding bit lines BL0 to BLm-1, respectively.

For reference, in each of the memory cells MC0 to MCn-1, single bit data may be stored, or multi-bit data of 2 or more bits may be stored. A single level cell (SLC) type nonvolatile memory device, which stores single bit data, has an erased state and a programmed state according to a threshold voltage distribution. A multi-level cell (MLC) type nonvolatile memory device, which stores multi-bit data, has one erased state and programmed states according to a threshold voltage distribution. In FIG. 3, 'DSL' denotes a drain select line, 'SSL' denotes a source select line, and 'CSL' denotes a common source line.

While FIG. 3 shows, as an example, the memory block 330 which is formed NAND flash memory cells, it is to be noted that the memory block 330 of the memory device 300 may be formed of a NOR flash memory, a hybrid flash memory including at least two kinds of memory cells that are combined, or a One-NAND flash memory including a controller built in a memory chip. The operational characteristics of a semiconductor device may be applied to not only a flash memory device in which a charge storing layer is comprised of conductive floating gates but also a charge trap flash (CTF) in which a charge storing layer is comprised of a dielectric layer.

A voltage supply block 310 of the memory device 300 may provide word line voltages, for example, a program voltage, a read voltage and a pass voltage, to be supplied to respective word lines according to an operation mode and voltages to be supplied to bulks, for example, well regions where memory cells are formed. The voltage generating operation of the voltage supply block 310 may be performed by the control of a control circuit (not shown). The voltage supply block 310 may generate a plurality of variable read voltages to generate a plurality of read data, select one of the memory blocks (or sectors) of a memory cell array under the control of the control circuit, select one of the word lines of the selected memory block, and provide the word line voltages to the selected word line and unselected word lines.

A read/write circuit 320 of the memory device 300 is controlled by the control circuit, and may operate as a sense amplifier or a write driver according to an operation mode. For example, in a verification/normal read operation, the read/write circuit 320 may operate as a sense amplifier for reading data from the memory cell array. Also, in a program operation, the read/write circuit 320 may operate as a write driver which drives bit lines according to data to be stored in the memory cell array. The read/write circuit 320 may receive data to be written in the memory cell array, from a buffer (not shown), in a program operation, and may drive the bit lines according to the inputted data. To this end, the read/write circuit 320 may include a plurality of page buffers (PB) 322, 324 and 326 respectively corresponding to columns (or bit lines) or pairs of columns (or pairs of bit lines), and a plurality of latches (not shown) may be included in each of the page buffers 322, 324 and 326.

Figure 4:
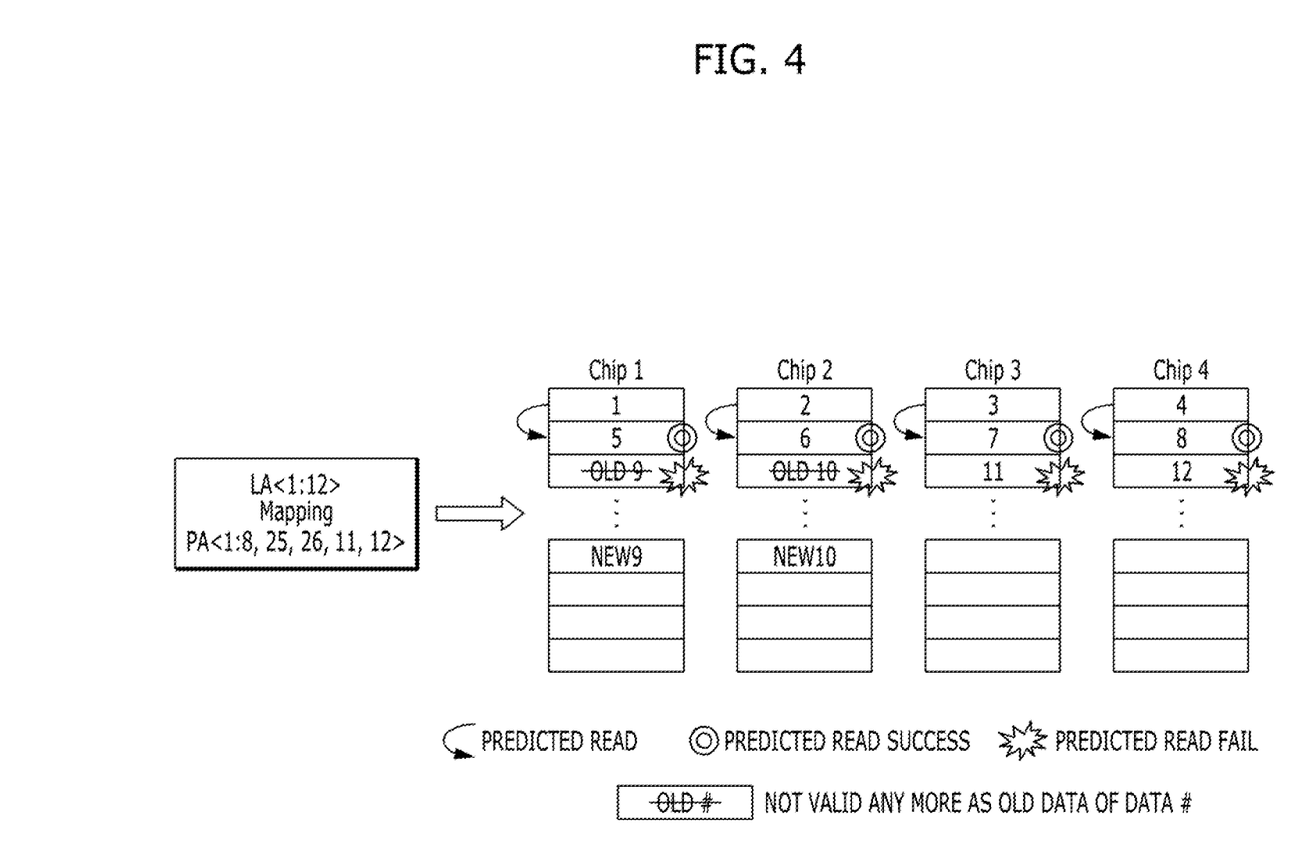
FIG. 4 is a diagram for describing a sequential read operation of a memory system.

FIG. 4 is a diagram for describing a sequential read operation of a memory system.

In general, a memory system performs a predicted read operation based on physical addresses when a sequential read operation is requested from a host.

In detail, the sequential read operation is an operation of controlling a memory system to consecutively output data pages a preset number of times.

Referring to FIG. 4, when read operations are to be performed consecutively 12 times according to the sequential read operation, 12 read operations are performed consecutively according to one sequential read command to sequentially output data, instead of outputting data through independent control of respective read operations.

Such a sequential read operation enables a predicted read operation, and thus data may be quickly outputted compared to separately controlling the respective read operations.

Since read operations are to be performed a preset number of times in the sequential read operation, the predicted read operation may be performed. In the predicted read operation, data with a high probability to be read (i.e., data predicted to be outputted in a subsequent read operation) is read in advance and stored in a page buffer, and then the stored data is outputted at data output timing without a delay.

Since the sequential read operation has a high probability of sequentially reading data consecutively under a predetermined condition, prediction may be possible if the predetermined condition is appropriately met. Conversely, a general read operation may be ineffective even though a predicted read operation is performed, because a predetermined condition for desired data may be completely changed whenever a read operation is performed.

Meanwhile, the predicted read operation is generally performed in such a manner where data adjacent to currently read data, based on a 'physical address', is read in advance. This is because, in a sequential read operation, data are highly likely to be read from physically adjacent pages during consecutive read operations. In addition, an operation of waiting for a time for converting a logical address applied from an exterior into a physical address and then reading data corresponding to the converted physical address is not a 'predicted read operation' but a 'general read operation'.

When 4 memory chips Chip1, Chip2, Chip3 and Chip4 are included in a memory system and 12 sequential logical addresses LA1 to LA12 are inputted in the sequential read operation, an operation is performed in which first data 1, 2, 3 and 4 are respectively outputted from the 4 memory chips Chip1, Chip2, Chip3 and Chip4 in response to 4 physical addresses PA1 to PA4 that correspond to 4 preceding logical addresses LA1 to LA4 among the sequential logical addresses LA1 to LA12.

After the operation of outputting the first data 1, 2, 3 and 4 from the respective 4 memory chips Chip1, Chip2, Chip3 and Chip4 is completely performed, a predicted read operation is performed during a time for converting the logical addresses LA5 to LA8 for selecting second data 5, 6, 7 and 8 to be outputted, into physical addresses PA5 to PA8. In the predicted read operation, the second data 5, 6, 7 and 8 are read and stored in the corresponding page buffers of the 4 memory chips Chip1, Chip2, Chip3 and Chip4 from the physical addresses PA5 to PA8 adjacent to the physical addresses PA1 to PA4 that have designated the first data 1, 2, 3 and 4.

If the first data 1, 2, 3 and 4 and the second data 5, 6, 7 and 8 actually have adjacent physical addresses, the predicted reading has succeeded. Accordingly, the data stored in the corresponding page buffers of the 4 memory chips Chip1, Chip2, Chip3 and Chip4 may be outputted as they are, after checking only whether the physical addresses PA5 to PA8 converted from the logical addresses LA5 to LA8 for selecting the second data 5, 6, 7 and 8 are the same as the physical addresses PA5 to PA8 used in the predicted reading, without performing additional read operations.

In succession, a predicted read operation is performed during a time for converting the logical addresses LA9 to LA12 for selecting third data 9, 10, 11 and 12 to be outputted following the second data 5, 6, 7 and 8, into physical addresses PA25, PA26, PA11 and PA12. In the predicted read operation, the third data 9, 10, 11 and 12 are read and stored in the corresponding page buffers of the 4 memory chips Chip1, Chip2, Chip3 and Chip4 from the physical addresses PA9 to PA12 adjacent to the physical addresses PA5 to PA8 that have designated the second data 5, 6, 7 and 8.

On the other hand, if the physical addresses of the second data 5, 6, 7 and 8 and third data OLD9, OLD10, 11 and 12 are not actually adjacent, the predicted reading has failed. Accordingly, the data read and stored in the corresponding page buffers of the 4 memory chips Chip1, Chip2, Chip3 and Chip4 through the predicted reading by using the result of checking only whether the physical addresses PA25, PA26, PA11 and PA12 converted from the logical addresses LA9 to LA12 for selecting the third data OLD9, OLD10, 11 and 12 are the same as the physical addresses PA9 to PA12 used in the predicted reading is ignored, and, after read operations are performed using the completely converted physical addresses PA25, PA26, PA11 and PA12, third data NEW9, NEW10, 11 and 12 read resultantly are outputted.

As described above, when the predicted read operation has succeeded in the memory system, improved efficiency is provided since a 'time for converting logical addresses into physical addresses' and a 'time for reading data to store in page buffers' may overlap with each other. However, when the predicted read operation has failed, since the data read in advance through the predicted reading are ignored, it results in unnecessary read operations having been performed.

In the memory system, the performance of a data read operation may be changed markedly according to whether a predicted read operation has succeeded or failed. Therefore, input/output data should be stored to have consecutive physical addresses to increase the probability of success of the predicted read operation.

Nevertheless, the more input/output and erase of data frequently occur in the memory system, the more the physical addresses of data are fragmented. Therefore, it may be difficult to cause input/output data to have consecutive physical addresses.

For reference, the descriptions were made above on the assumption that the predicted read operation is performed by a unit of data corresponding to 4 pages. However, it is to be noted that the predicted read operation may be performed in units of data that are smaller or larger than the unit of data corresponding to 4 pages.

Figure 5:
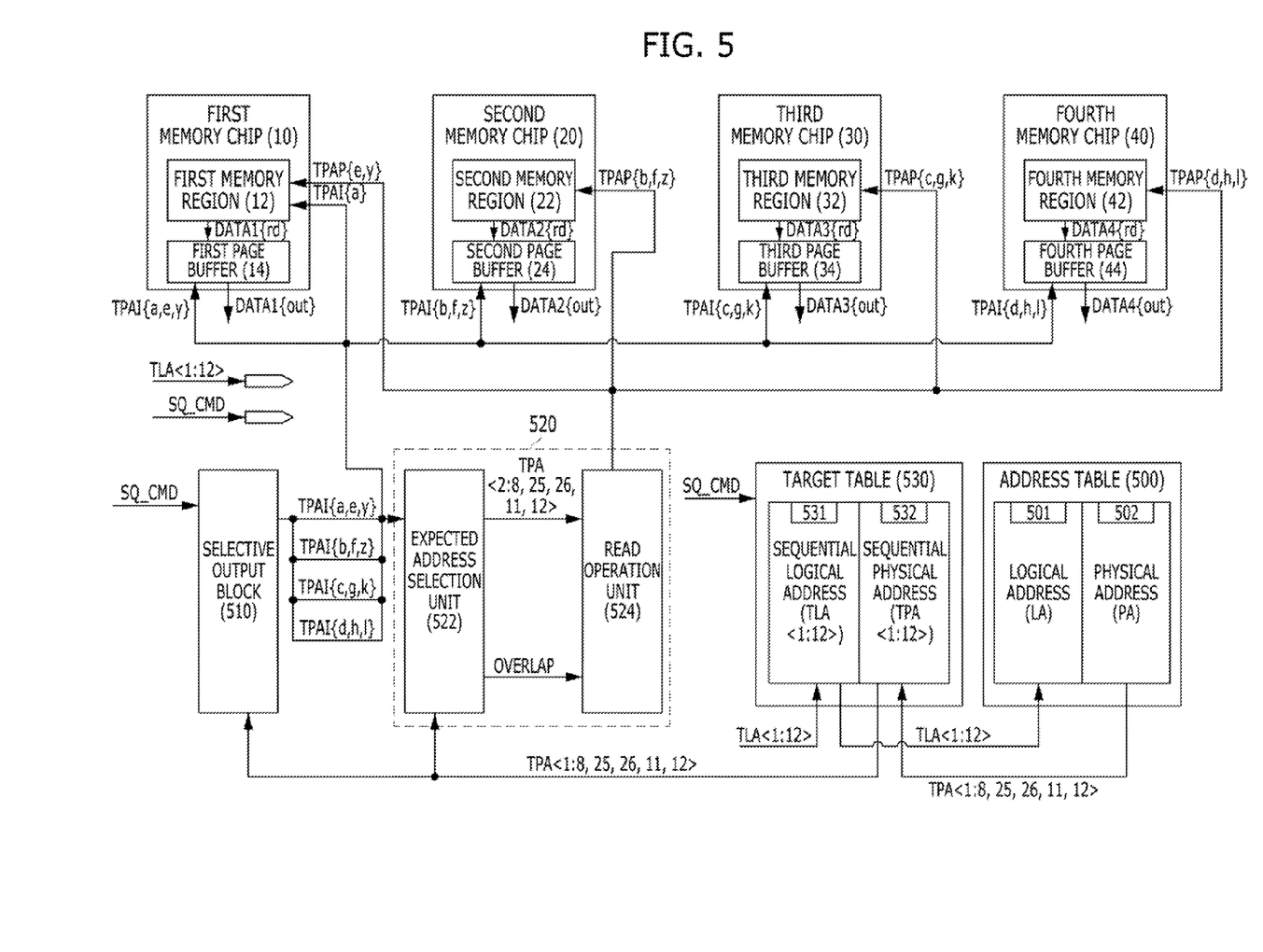
FIG. 5 is a block diagram illustrating a memory system in accordance with an embodiment.

FIG. 5 is a block diagram illustrating a memory system in accordance with an embodiment. FIG. 5 shows configurations of a memory system for performing a sequential read operation, which are based on the configuration of the memory system shown in FIG. 1.

Referring to FIG. 5, the memory system may include a plurality of memory chips 10, 20, 30 and 40, an address table 500, a target table 530, a selective output block 510, and an expected read block 520. In the respective memory chips 10, 20, 30 and 40, memory regions 12, 22, 32 and 42 and page buffers 14, 24, 34 and 44 are included. Also, in the address table 500, a space 501 for storing logical addresses and a space 502 for storing physical addresses are included. Further, in the target table 530, a space 531 for storing sequential logical addresses TLA<1:12> and a space 532 for storing sequential physical addresses TPA<1:8, 25, 26, 11, 12> are included. Moreover, in the expected read block 520, an expected address selection unit 522 and a read operation unit 524 are included.

It is illustrated that 4 memory chips, that is, a first memory chip 10, a second memory chip 20, a third memory chip 30 and a fourth memory chip 40 are included in the memory chips 10, 20, 30 and 40. Accordingly, a first memory region 12 and a first page buffer 14 are included in the first memory chip 10. A second memory region 22 and a second page buffer 24 are included in the second memory chip 20. A third memory region 32 and a third page buffer 34 are included in the third memory chip 30. A fourth memory region 42 and a fourth page buffer 44 are included in the fourth memory chip 40. Of course, unlike the illustrations, memory chips the number of which is greater than 4 may be included in the memory chips 10, 20, 30 and 40, and memory chips the number of which is less than 4 may be included in the memory chips 10, 20, 30 and 40.

Each of the first to fourth memory chips 10, 20, 30 and 40 may have the same configuration as the memory device described above with reference to FIGS. 2 and 3.

The address table 500 stores mapping information between the physical addresses for identifying the respective memory regions 12, 22, 32 and 42 of the memory chips 10, 20, 30 and 40 by the unit of a physical page and the logical addresses for identifying the respective memory regions 12, 22, 32 and 42 of the memory chips 10, 20, 30 and 40 by the unit of a logical page.

The logical addresses as addresses used outside the memory system are addresses which are logically consecutive. That is to say, since the logical addresses are addresses which are allocated by a user who uses the memory system, values thereof are fixed once they are allocated.

Conversely, the physical addresses for directly designating the respective memory regions 12, 22, 32 and 42 of the memory chips 10, 20, 30 and 40 in the memory system may be inconsecutively allocated according to an operation of the memory system. In other words, the values of the physical addresses may be changed due to reasons such as conversion of a certain page into an invalid state according to a data input operation, an erase operation or an error recovery operation performed in each of the memory chips 10, 20, 30 and 40 included in the memory system.

When an operation in which a change in the values of the physical addresses occurs due to such characteristics of the logical addresses and the physical addresses is performed, the mapping information stored in the address table 500 may become the wrong information due to a change in the values of the physical addresses.

Hence, when the physical addresses are changed due to an operation in which a change in the values of the physical addresses occurs, for example, when the physical addresses are changed due to a data input operation, an erase operation or an error recovery operation performed in each of the memory chips 10, 20, 30 and 40 included in the memory system, the address table 500 updates and stores in real time the mapping information between the changed physical addresses and the logical addresses LA.

For reference, the address table 500 may be included in the memory 144 shown in FIG. 1, an operation such as the update of the mapping information stored therein may be performed by the processor 134.

In the target table 530, the sequential physical addresses TPA<1:8, 25, 26, 11, 12> converted from the sequential logical addresses TLA<1:12> through the address table 500 are stored. Namely, the target table 530 searches the sequential logical addresses TLA<1:12> among the logical addresses of the address table 500, and stores the physical addresses mapped to the searched logical addresses, as the sequential physical addresses TPA<1:8, 25, 26, 11, 12>.

The sequential logical addresses TLA<1:12>, as addresses inputted from an exterior together with a sequential command SQ_CMD, are logical addresses which are used in respective read operations when the read operations are consecutively performed a preset number of times in the memory system. For example, when a read operation is to be performed consecutively 12 times in response to the sequential command SQ_CMD in the memory system, the values of 12 logical addresses exist in the sequential logical addresses TLA<1:12>, and are respectively used in 12 times read operations.

Since the sequential logical addresses TLA<1:12> has a concept in which the logical addresses already being used in the memory system are grouped by the preset number, the respective values of the sequential logical addresses TLA<1:12> are values that already exist among the logical addresses stored in the address table 500. Therefore, by searching the values of the respective sequential logical addresses TLA<1:12> in the address table 500, the values of the sequential physical addresses TPA<1:8, 25, 26, 11, 12> according to the mapping information of the address table 500 may be known.

The target table 530 separately extracts and stores only the values of the sequential logical addresses TLA<1:12> and the sequential physical addresses TPA<1:8, 25, 26, 11, 12> mapped thereto.

Since the amount of logical addresses stored in the address table 500 is huge, a substantial period of time is required to perform the operation of searching the sequential logical addresses TLA<1:12> among the logical addresses stored in the address table 500, and thus the target table 530 is used. That is to say, if a search is performed in the address table 500 each time the sequential physical addresses TPA<1:8, 25, 26, 11, 12> mapped to the sequential logical addresses TLA<1:12> are used, it would be inefficient.

Further, since the preset number of logical addresses are actually included in the sequential logical addresses TLA<1:12>, it should be defined in advance that the preset number of logical addresses are to be used in which order. Thus, the sequential logical addresses TLA<1:12> stored in the target table 530 are stored in a preset order and, accordingly, the sequential physical addresses TPA<1:8, 25, 26, 11, 12> are also stored in the preset order.

An operation period for searching the sequential physical addresses TPA<1:8, 25, 26, 11, 12> mapped to the sequential logical addresses TLA<1:12> in the address table 500 may overlap with a period for performing the sequential read operation by using the sequential physical addresses TPA<1:8, 25, 26, 11, 12>. In other words, while the sequential logical addresses TLA<1:12> inputted earlier according to the preset order among the sequential logical addresses TLA<1:12> are searched and converted into the sequential physical addresses TPA<1:8, 25, 26, 11, 12> in the address table 500 and the converted sequential physical addresses TPA<1:8, 25, 26, 11, 12> are used in the selective output block 510, the sequential logical addresses inputted later according to the preset order among the sequential logical addresses TLA<1:12> may be searched and converted into the sequential physical addresses TPA<1:8, 25, 26, 11, 12> in the address table 500.

For example, the sequential physical addresses TPA<1:8, 25, 26, 11, 12> may be stored in the target table 530 in the following order.

First, first to fourth sequential logical addresses TLA<1:4>, which are inputted earlier among the sequential logical addresses TLA<1:12>, are searched in the address table 500 as soon as they are inputted, and are stored in the target table 530 as first to fourth sequential physical addresses TPA<1:4>.

Thereafter, during an operation period in which the first to fourth sequential physical addresses TPA<1:4> are used in the selective output block 510, fifth to eighth sequential logical addresses TLA<5:8>, which are inputted later among the sequential logical addresses TLA<1:12>, are searched in the address table 500, and are stored in the target table 530 as fifth to eighth sequential physical addresses TPA<5:8>.

Then, during an operation period in which the fifth to eighth sequential physical addresses TPA<5:8> are used in the selective output block 510, ninth to twelfth sequential logical addresses TLA<9:12>, which are inputted later among the sequential logical addresses TLA<1:12>, are searched in the address table 500, and are stored in the target table 530 as twenty-fifth and twenty-sixth, eleventh and twelfth sequential physical addresses TPA<25, 26, 11, 12>.

For reference, when generating the target table 530, by which number the sequential physical addresses TPA<1:8, 25, 26, 11, 12> inputted according to the preset order are to be divided, searched in the address table 500 and stored in the target table 530, it may be determined according to a designer's choice. Namely, while it may be possible that the sequential physical addresses TPA<1:8, 25, 26, 11, 12> may be divided, searched in the address table 500 and stored in the target table 530 by the number 4, as described above as an example, it is to be noted that the sequential physical addresses TPA<1:8, 25, 26, 11, 12> may be divided, searched in the address table 500 and stored in the target table 530, by a number less than 4 or a number greater than 4.

While it is the norm that, as described above, the preset order is the order in which the sequential logical addresses TLA<1:12> are applied to the memory system, the preset order may be defined by a condition specified according to a demand.

The target table 530 may be included in the memory 144 shown in FIG. 1.

The selective output block 510 selects the memory regions 12, 22, 32 and 42 of the memory chips 10, 20, 30 and 40, as pages {a, b, c, d, e, f, g, h, y, z, k, l} under selection, by the unit of a page in the preset order in response to the sequential physical addresses TPA<1:8, 25, 26, 11, 12>, and outputs data DATA1{out}, DATA2{out}, DATA3{out} and DATA4{out} stored in the page buffers 14, 24, 34 and 44 of the memory chips under selection, corresponding to the pages {a, b, c, d, e, f, g, h, y, z, k, l} under selection, among the memory chips 10, 20, 30 and 40, to the exterior.

For example, when assuming that the page designated by the seventh sequential physical address TPA<7> among the sequential physical addresses TPA<1:8, 25, 26, 11, 12> is a page 'g' included in the third memory region 32 of the third memory chip 30, the selective output block 510 selects the page 'g' as the page {g} under selection in response to the seventh sequential physical address TPA<7>, and transfers a seventh selection control signal TPAI{g} for outputting to the exterior the data DATA3{out} stored in the third page buffer 34 of the third memory chip 30 corresponding to the third memory region 32 in which the page 'g' as the page {g} under selection is included, to the third page buffer 34 of the third memory chip 30. Since the seventh selection control signal TPAI{g} corresponds to the page 'g', the information of the seventh sequential physical address TPA<7> may be included in the seventh selection control signal TPAI{g}.

For another example, when assuming that the page designated by the first sequential physical address TPA<1> among the sequential physical addresses TPA<1:8, 25, 26, 11, 12> is a page 'a' included in the first memory region 12 of the first memory chip 10, the selective output block 510 selects the page 'a' as the page {a} under selection in response to the first sequential physical address TPA<1>, and transfers a first selection control signal TPAI{a} for outputting to the exterior the data DATA1{out} stored in the first page buffer 14 of the first memory chip 10 corresponding to the first memory region 12 in which the page 'a' as the page {a} under selection is included, to the first page buffer 14 of the first memory chip 10. Since the first selection control signal TPAI{a} corresponds to the page 'a', the information of the first sequential physical address TPA<1> may be included in the first selection control signal TPAI{a}.

Meanwhile, the selective output block 510 may operate in two ways as described below.

A first way is an operation of selecting one page in any one memory chip among the memory chips 10, 20, 30 and 40, as one of the pages {a, b, c, d, e, f, g, h, y, z, k, l} under selection, by using the sequential physical addresses TPA<1:8, 25, 26, 11, 12> stored in the target table 530, one by one in preset order, each time the selecting operation is performed once.

Assuming that the memory chips 10, 20, 30 and 40 are respectively selected once when the selecting operation according to the first way is consecutively performed a first cycle number of times, while the selecting operation is consecutively performed a preset number of times according to preset order, when the preset number of times is greater than the first cycle number of times, the respective memory chips 10, 20, 30 and 40 may be selected repeatedly at least once according to the preset order. Of course, while the selecting operation is consecutively performed a preset number of times according to a preset order, when the preset number of times is less than the first cycle number of times, one part of the memory chips 10, 20, 30 and 40 may be selected and the other part may not be selected, according to the preset order.

A second way is an operation of grouping at least two pages from each of at least two memory chips 10 and 20, 10 and 30, 10 and 40, 20 and 30, 20 and 40 or 30 and 40 among the memory chips 10, 20, 30 and 40 and selecting the grouped pages as the pages {a, b, c, d, e, f, g, h, y, z, k, l)} under selection, by using at least two of the sequential physical addresses TPA<1:8, 25, 26, 11, 12> stored in the target table 530, in preset order, each time the selecting operation is performed once.

Assuming that the memory chips 10, 20, 30 and 40 are respectively selected once when the selecting operation according to the second way is consecutively performed a second cycle number of times, while the selecting operation is consecutively performed a preset number of times according to preset order, when the preset number of times is greater than the second cycle number of times, the respective memory chips 10, 20, 30 and 40 may be selected repeatedly at least once according to the preset order. Of course, while the selecting operation is consecutively performed a preset number of times according to preset order, when the preset number of times is less than the second cycle number of times, one part of the memory chips 10, 20, 30 and 40 may be selected and the other part may not be selected, according to the preset order.

The first selecting operation and the second selecting operation may be determined according to whether the output of data in the memory system is implemented by the unit of one page or by the unit of at least two pages, in conformity with the designer's choice.

From the above descriptions, the selective output block 510 performs only the operation of determining whether the data DATA1{out}, DATA2{out}, DATA3{out} and DATA4{out} are to be outputted from the respective page buffers 14, 24, 34 and 44 of the memory chips 10, 20, 30 and 40, in response to the sequential physical addresses TPA<1:8, 25, 26, 11, 12>. In this regard, attributable to the characteristics of the memory chips 10, 20, 30 and 40, data DATA1{rd}, DATA2{rd}, DATA3{rd} and DATA4{rd} of the memory regions 12, 22, 32 and 42 should be read and stored in the page buffers 14, 24, 34 and 44 before the data DATA1{out}, DATA2{out}, DATA3{out} and DATA4{out} are outputted from the page buffers 14, 24, 34 and 44. Due to this fact, when the expected read block 520 as described below operates together with the selective output block 510, the sequential read operation may be normally performed.

While the data DATA1{out}, DATA2{out}, DATA3{out} and DATA4{out} stored in the page buffers 14, 24, 34 and 44 of the memory chips 10, 20, 30 and 40 under selection are outputted to the exterior through the selective output block 510, the expected read block 520 reads the data DATA1{rd}, DATA2{rd}, DATA3{rd} and DATA4{rd} stored in selection-expected pages {b, c, d, e, f, g, h, y, z, k, l} to be selected following the pages {a, b, c, d, e, f, g, h, y, z, k, l} under selection according to the preset order in the selective output block 510, to the page buffers 14, 24, 34 and 44 of selection-expected memory chips corresponding to the selection-expected pages {b, c, d, e, f, g, h, y, z, k, l} among the memory chips 10, 20, and 40.

For example, while the selective output block 510 selects the page 'g' as the page {g} under selection and the data DATA3{out} stored in the third page buffer 34 of the third memory chip 30 are outputted, the expected read block 520 sets the page 'h' to be selected next to the page 'g' according to the preset order of the sequential physical addresses TPA<1:8, 25, 26, 11, 12>, as the selection-expected page {h}, and transfers an eighth read control signal TPAP{h} to the fourth memory region 42, to ensure that the data DATA4{rd} stored in the page 'h' in the fourth memory region 42 of the fourth memory chip 40 in which the page 'h' as the selection-expected page {h} is included may be read and stored in the fourth page buffer 44. Since the eighth read control signal TPAP{h} corresponds to the page 'h', the information of the eighth sequential physical address TPA<8> may be included in the eighth read control signal TPAP{h}.

For another example, while the selective output block 510 selects the page 'a' as the page {a} under selection and the data DATA1{out} stored in the first page buffer 14 of the first memory chip are outputted, the expected read block 520 sets the page 'b' to be selected next to the page 'a' according to the preset order of the sequential physical addresses TPA<1:8, 25, 26, 11, 12>, as the selection-expected page {b}, and transfers a second read control signal TPAP{b} to the second memory region 22, to ensure that the data DATA2{rd} stored in the page 'b' in the second memory region 22 of the second memory chip 20 in which the page 'b' as the selection-expected page {b} is included may be read and stored in the second page buffer 24. Since the second read control signal TPAP{b} corresponds to the page 'b', the information of the second sequential physical address TPA<2> may be included in the second read control signal TPAP{b}.

While the selective output block 510 outputs the data DATA1{out}, DATA2{out}, DATA3{out} and DATA4{out} corresponding to the pages {a, b, c, d, e, f, g, h, y, z, k, l} under selection, from the page buffers 14, 24, 34 and 44 of the memory chips 10, 20, 30 and 40, the expected read block 520 reads the data DATA1{rd}, DATA2{rd}, DATA3{rd} and DATA4{rd} corresponding to the selection-expected pages {b, c, d, e, f, g, h, y, z, k, l} to be selected next to the pages {a, b, c, d, e, f, g, h, y, z, k, l} under selection, to the page buffers 14, 24, 34 and 44 of the memory chips 10, 20, 30 and 40.

When the page 'a' designated by the first sequential physical address TPA<1> corresponding to a first order among the sequential physical addresses TPA<1:8, 25, 26, 11, 12> according to the order set in the selective output block 510 is selected as the page {a} under selection, the expected read block 520 has never operated because the selective output block 510 has never operated before the selecting operation and, accordingly, it is not the state in which the data DATA1{rd} of the page {a} under selection are read and stored in the first page buffer 14.

Therefore, when the page 'a' designated by the first sequential physical address TPA<1> corresponding to a first order among the sequential physical addresses TPA<1:8, 25, 26, 11, 12> according to the order set in the selective output block 510 is selected as the page {a} under selection, the selective output block 510 reads the data DATA1{rd} stored in the page 'a' as the page {a} under selection, to the first page buffer 14, and then, outputs the data DATA1{out} of the first page buffer 14. To this end, the first output control signal TPAI{a} is applied to not only the first page buffer 14 but also to the first memory region 12 of the first memory chip 10.

The expected address selection unit 522 selects the sequential physical addresses TPA<2:8, 25, 26, 11, 12> according to the order next to the sequential physical addresses TPA<1:8, 25, 26, 11, 12> being used in the selective output block 510 among the sequential physical addresses TPA<1:8, 25, 26, 11, 12> stored in the target table 530 according to the preset order, as expected physical addresses TPA<2:8, 25, 26, 11, 12>.

For example, when the selective output block 510 selects the page {g} under selection by using the seventh sequential physical address TPA<7>, the expected address selection unit 522 selects the eighth sequential physical address TPA<8> as the expected physical address TPA<8>, based on the information of the seventh sequential physical address TPA<7> included in the seventh selection control signal TPAI{g} corresponding to the page {g} under selection and information on the preset order.

Furthermore, when the selective output block 510 selects the page {a} under selection by using the first sequential physical address TPA<1>, the expected address selection unit 522 selects the second sequential physical address TPA<2> as the expected physical address TPA<2>, based on the information of the first sequential physical address TPA<1> included in the first selection control signal TPAI{a} corresponding to the page {a} under selection and the information on the preset order.

The read operation unit 524 reads the data DATA1{rd}, DATA2{rd}, DATA3{rd} and DATA4{rd} stored in the selection-expected pages {b, c, d, e, f, g, h, y, z, k, l} designated by the expected physical addresses TPA<2:8, 25, 26, 11, 12>, to the page buffers 14, 24, 34 and 44 of the selection-expected memory chips 10, 20, 30 and 40.

For example, when the expected address selection unit 522 selects the eighth sequential physical address TPA<8> as the expected physical address TPA<8>, the read operation unit 524 selects the page 'h' designated by the eighth sequential physical address TPA<8>, as the selection-expected page {h}, and transfers the eighth read control signal TPAP{h} to the fourth memory region 42, to ensure that the data DATA4{rd} stored in the page 'h' in the fourth memory region 42 of the fourth memory chip 40 in which the page 'h' as the selection-expected page {h} is included may be read and stored in the fourth page buffer 44.

Furthermore, when the expected address selection unit 522 selects the second sequential physical address TPA<2> as the expected physical address TPA<2>, the read operation unit 524 selects the page 'b' designated by the second sequential physical address TPA<2>, as the selection-expected page {b}, and transfers the second read control signal TPAP{b} to the second memory region 22, to ensure that the data DATA2{rd} stored in the page 'b' in the second memory region 22 of the second memory chip 20 in which the page 'b' as the selection-expected page {b} is included may be read and stored in the second page buffer 24.

After selecting the expected physical addresses TPA<2:8, 25, 26, 11, 12> and before transmitting them to the read operation unit 524, the expected address selection unit 522 performs an operation of determining whether the expected physical addresses TPA<2:8, 25, 26, 11, 12> are in an 'overlapped state' or not. To this end, the expected address selection unit 522 compares the values of all the sequential physical addresses TPA<1:8, 25, 26, 11> (i.e., values designating the pages 'a, b, c, d, e, f, g, h, y, z, k') corresponding to the order before the sequential physical addresses TPA<1: 8, 25, 26, 11, 12> being used in the selective output block 510 among the sequential physical addresses TPA<1:8, 25, 26, 11, 12> stored in the target table 530 according to the preset order and the values of the expected physical addresses TPA<2:8, 25, 26, 11, 12> (i.e., values designating the pages 'b, c, d, e, f, g, h, y, z, k, l'), and thereby determines an overlap. For example, when the selective output block 510 is using the seventh sequential physical address TPA<7>, after selecting the eighth sequential physical address TPA<8> as the expected physical address TPA<8>, the expected address selection unit 522 compares the value of the expected physical address TPA<8> (i.e., the value designating the page 'h') with the values of the first to seventh sequential physical addresses TPA<1:7> (i.e., the values designating the pages 'a, b, c, d, e, f, g'), and thereby determines an 'overlapped state'.

When it is determined by the expected address selection unit 522 that the values of the expected physical addresses TPA<2:8, 25, 26, 11, 12> (i.e., the values designating the pages 'b, c, d, e, f, g, h, y, z, k, l') are in an 'overlapped state', the read operation unit 524 does not read the data stored in the selection-expected pages {b, c, d, e, f, g, h, y, z, k, l} designated by the expected physical addresses TPA<2:8, 25, 26, 11, 12>, and retains the data having been stored in the page buffers 14, 24, 34 and 44 of the selection-expected memory chips 10, 20, 30 and 40 as they are. In other words, in the selection-expected pages {b, c, d, e, f, g, h, y, z, k, l} corresponding to expected physical addresses TPA<2:8, 25, 26, 11, 12> which are determined as the 'overlapped state' by the expected address selection unit 522, because they have been already read in advance to the page buffers 14, 24, 34 and 44 of the selection-expected memory chips 10, 20, 30 and 40, it is not necessary to perform the read operation again. Therefore, in the selection-expected pages {b, c, d, e, f, g, h, y, z, k, l} corresponding to expected physical addresses TPA<2:8, 25, 26, 11, 12> which are determined as the 'overlapped state' by the expected address selection unit 522, the read operation unit 524 does not transfer read control signals TPAI{b, c, d, e, f, g, h, y, z, k, l} to the memory regions 12, 22, 32 and 42 of the memory chips 10, 20, 30 and 40. To inform the read operation unit 524 of whether the values of the expected physical addresses TPA<2:8, 25, 26, 11, 12> (i.e., the values designating the pages 'b, c, d, e, f, g, h, y, z, k, l') are determined as an 'overlapped state', the expected address selection unit 522 additionally transfers an overlap determination signal OVERLAP to the read operation unit 524.

Because it is illustrated that all the sequential physical addresses TPA<1:8, 25, 26, 11, 12> have different values (i.e., values designating the pages 'a, b, c, d, e, f, g, h, y, z, k, l'), when the sequential read operation is performed, determination of an 'overlapped state' does not occur for all the expected physical addresses TPA<2:8, 25, 26, 11, 12>.

However, for example, when assuming a different situation than that of the illustration of FIG. 5 in which the sequential physical addresses TPA<1:8, 25, 26, 11, 12> have values designating pages 'a, b, c, d, a, b, c, d, e, f, g, h', the value of the expected physical address TPA<7> is the value designating a page 'c' and is the same as the value designating the page 'c' being the value of the third sequential physical address TPA<3>. In this case, the expected physical address TPA<7> is determined as an 'overlapped state'. If the expected physical address TPA<7> is determined as an 'overlapped state', the read operation unit 524 does not transfer a seventh read control signal TPAP{c} to the third memory region 32 of the third memory chip 30 corresponding to the expected physical address TPA<7>. Accordingly, in the third page buffer 34 of the third memory chip 30, the data DATA3{rd} having previously been read in response to a third read control signal TPAP{c} are retained as they are.

Meanwhile, an update operation in which the values of the physical addresses of the address table 500 are changed may be performed even while the sequential read operation is performed.

For example, even though the sequential command SQ_CMD is set to the effect that a read operation be performed consecutively 12 times through a sequential read operation, an update operation in which the values of the physical addresses of the address table 500 are changed may be performed due to an operation in which other data are abruptly inputted or erased when a fifth read operation is about to be performed after the read operation is performed 4 times. In this case, since it is while the sequential read operation is being performed, information on the sequential physical addresses TPA<1:4> corresponding to the 4 read operations, which are determined at the start time of the sequential read operation and are outputted by being already used in the read operations, may be updated. Thus, even though the sequential physical addresses TPA<5:8, 25, 26, 11, 12> to be used in the periods in which the fifth to twelfth read operations are performed designate the same pages as the sequential physical addresses TPA<1:4> having been used in the 4 times read operations performed before the update, the values stored in corresponding pages may be different in the respective operations.

Therefore, when an update operation in which the values of the physical addresses of the address table 500 are changed is performed, the read operation unit 524 reads the data stored in the selection-expected pages {b, c, d, e, f, g, h, y, z, k, l} designated by the expected physical addresses TPA<2:8, 25, 26, 11, 12>, to the page buffers 14, 24, 34 and 44 of the selection-expected memory chips 10, 20, 30 and 40, regardless of a determination result for an 'overlapped state' by the expected address selection unit 522.

For example, when assuming that the sequential physical addresses TPA<1:4> used in the 4 times read operations performed before the update have values for designating pages 'a, b, c, d' and the sequential physical addresses TPA<5:8, 25, 26, 11, 12> used in the 8 times read operations performed after the update have values for designating the pages 'a, b, c, d, a, b, c, d', the first to fourth sequential physical addresses TPA<1:4> used before the update and the fifth to eighth sequential physical addresses TPA<5:8> used after the update have the same values. Also, similar to the fifth to eighth sequential physical addresses TPA<5:8> used after the update, twenty-fifth, twenty-sixth, eleventh and twelfth sequential physical addresses TPA<25, 26, 11, 12> used after the update may have the same values as well.

When the read operation unit 524 receives a determination result for an 'overlapped state' by the expected address selection unit 522, the data DATA1{rd}, DATA2{rd}, DATA3{rd} and DATA4{rd} read and stored in the page buffers 14, 24, 34 and 44 from the pages 'a, b, c, d' by using the first to fourth sequential physical addresses TPA<1:4> in the 4 times read operations before the update are retained as they are, in the fifth to twelfth read operations performed after the update, causing an incorrect operation.

Therefore, the read operation unit 524 in accordance with the embodiment recognizes that an update has occurred in the address table 500 and, accordingly, selectively receives a determination result for an 'overlapped state' by the expected address selection unit 522. Namely, the data DATA1{rd}, DATA2{rd}, DATA3{rd} and DATA4{rd} read and stored in the page buffers 14, 24, 34 and 44 from the pages 'a, b, c, d' by using the sequential physical addresses TPA<1:4> in the 4 times read operations before the update are replaced with the data DATA1{rd}, DATA2{rd}, DATA3{rd} and DATA4{rd} read and stored in the page buffers 14, 24, 34 and 44 from the pages 'a, b, c, d' by using the fifth to eighth sequential physical addresses TPA<5:8> in the fifth to eighth read operations performed after the update. Moreover, the data DATA1{rd}, DATA2{rd}, DATA3{rd} and DATA4{rd} read and stored in the page buffers 14, 24, 34 and 44 from the pages 'a, b, c, d' by using the fifth to eighth sequential physical addresses TPA<5:8> in the fifth to eighth read operations performed after the update are retained as they are, in the ninth to twelfth read operations performed similarly after the update.

For reference, as a method for informing the read operation unit 524 that the physical addresses stored in the address table 500 are updated, a method of transmitting a specified signal Indicating that the physical addresses stored in the address table 500 are updated, to the read operation unit 524, may be used. When an operation, for example, a data input operation or an erase operation, in which the physical addresses of the address table 500 may be updated, is performed while the sequential read operation is performed, a method for the read operation unit 524 to unconditionally ignore the determining operation of the expected address selection unit 522 may be used.

The selective output block 510 and the expected read block 520 may be included in the NFC 142 or the processor 134 shown in FIG. 1.

Figure 6A:
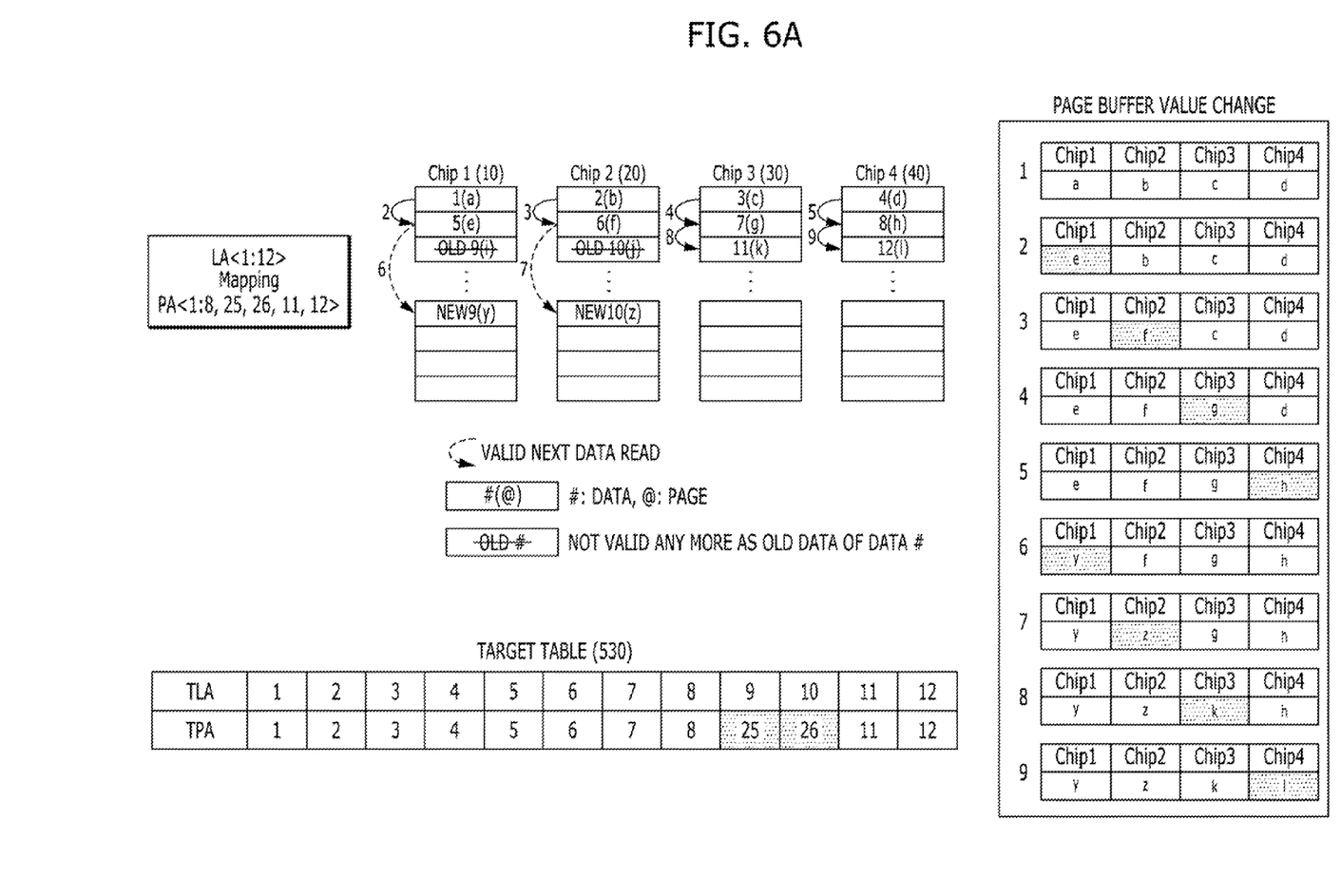
FIGS. 6A and 6B are diagrams for describing a sequential read operation of the memory system shown in FIG. 5.
Figure 6B:
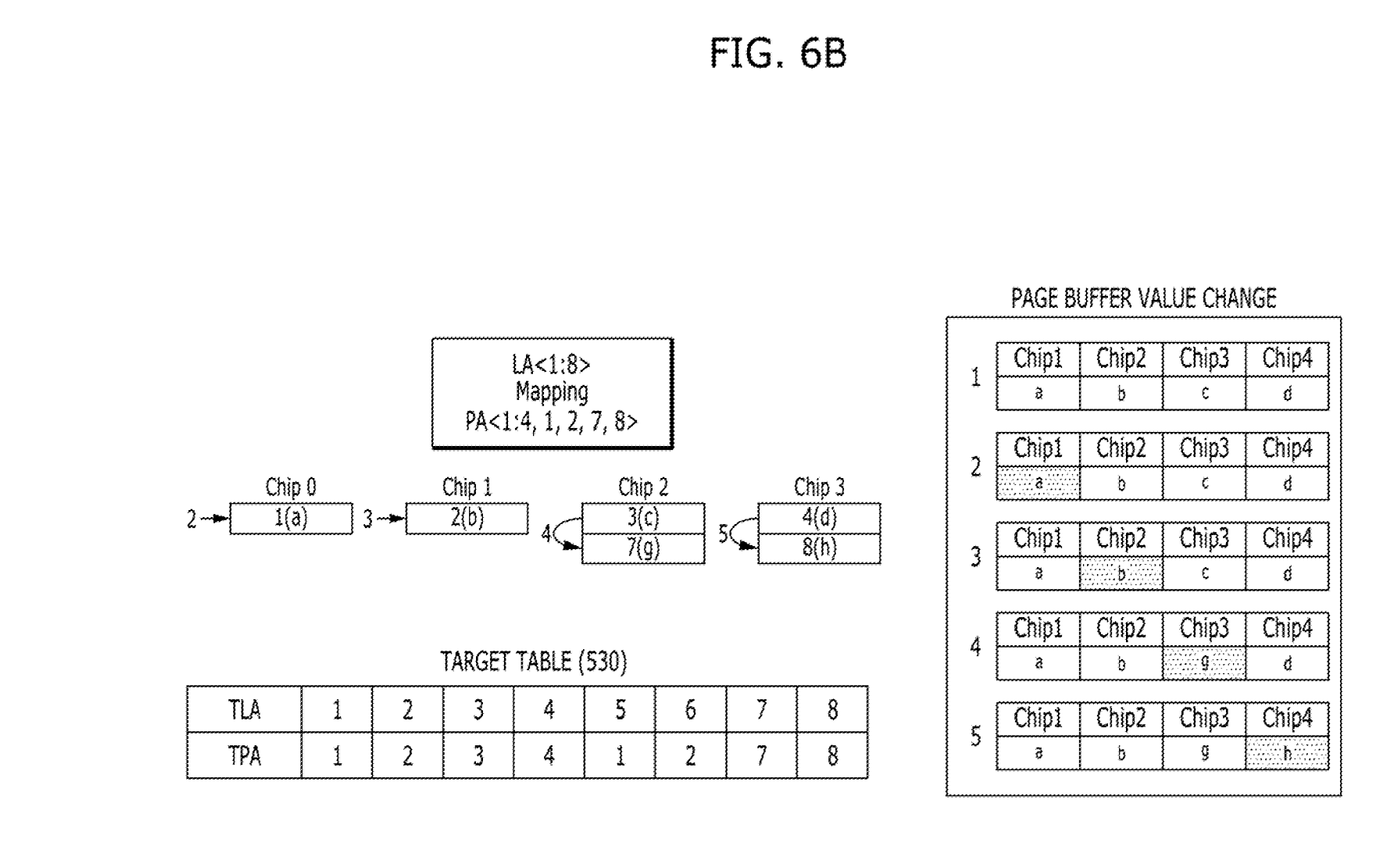

FIGS. 6A and 6B are diagrams to assist in the explanation of a sequential read operation of the memory system in accordance with the embodiment.

Referring to FIGS. 6A and 6B, the memory system generates the target table 530 and performs the predicted read operation based on the logical addresses when the sequential read operation is requested from the host.

In detail, referring to FIG. 6A, if the 12 sequential logical addresses TLA<1:12> are inputted in the sequential read operation, the values thereof are searched in the address table 500, conversion is made to the 12 sequential physical addresses TPA<1:8, 25, 26, 11, 12>, and the converted sequential physical addresses TPA<1:8, 25, 26, 11, 12> are stored in the target table 530.

The 12 sequential logical addresses TLA<1:12> are searched in the address table 500 by the unit of a preset number according to the preset order in which they are inputted, and the 12 sequential physical addresses TPA<1:8, 25, 26, 11, 12> are stored in the target table 530 according to the preset order.

For example, the first and second sequential logical addresses TLA<1:2> inputted at a first order are first searched in the address table 500 and are stored in the target table 530 as the first and second sequential physical addresses TPA<1:2>. While an operation in which data 1 and 2 stored in corresponding pages 'a' and 'b' are outputted to the exterior by using the first and second sequential physical addresses TPA<1:2> is performed, the third and fourth sequential logical addresses TLA<3, 4> are inputted, are searched in the address table 500 and are stored in the target table 530 as the third and fourth sequential physical addresses TPA<3, 4>. On the other hand, while an operation in which data 3 and 4 stored in corresponding pages 'c' and 'd' are outputted to the exterior by using the third and fourth sequential physical addresses TPA<3, 4> is performed, the fifth and sixth sequential logical addresses TLA<5, 6> are inputted, are searched in the address table 500 and are stored in the target table 530 as the fifth and sixth sequential physical addresses TPA<5, 6>. The 12 sequential logical addresses TLA<1:12> may be converted into the 12 sequential physical addresses TPA<1:8, 25, 26, 11, 12> according to the preset order, and the converted sequential physical addresses TPA<1:8, 25, 26, 11, 12> may be stored in the target table 530.

Operations in which data are outputted from the memory chips 10, 20, 30 and 40 by using the sequential physical addresses TPA<1:8, 25, 26, 11, 12> stored in the target table 530 will be described below.

First, the data 1 stored in the page 'a' of the first memory chip 10 designated by the first sequential physical address TPA<1> is read and stored in the first page buffer 14, and is outputted to the exterior immediately when the reading is completed.

While the operation in which the data 1 is outputted from the first memory chip 10 designated by the first sequential physical address TPA<1> is performed, the data 2 stored in the page 'b' of the second memory chip 20 designated by the second sequential physical address TPA<2> is read and stored in the second page buffer 24, and the output of the data 2 from the second page buffer 24 of the second memory chip 20 is implemented after the output of the data 1 from the first page buffer 14 of the first memory chip 10 is completed.

While the operation in which the data 2 is outputted from the second memory chip 20 designated by the second sequential physical address TPA<2> is performed, the data 3 stored in the page 'c' of the third memory chip 30 designated by the third sequential physical address TPA<3> is read and stored in the third page buffer 34, and the output of the data 3 from the third page buffer 34 of the third memory chip 30 is implemented after the output of the data 2 from the second page buffer 24 of the second memory chip 20 is completed.

While the operation in which the data 3 is outputted from the third memory chip 30 designated by the third sequential physical address TPA<3> is performed, the data 4 stored in the page 'd' of the fourth memory chip 40 designated by the fourth sequential physical address TPA<4> is read and stored in the fourth page buffer 44, and the output of the data 4 from the fourth page buffer 44 of the fourth memory chip 40 is implemented after the output of the data 3 from the third page buffer 34 of the third memory chip 30 is completed.

While the operation in which the data 4 is outputted from the fourth memory chip 40 designated by the fourth sequential physical address TPA<4> is performed, data 5 stored in the page 'e' of the first memory chip 10 designated by the fifth sequential physical address TPA<5> is read and stored in the first page buffer 14. At this time, the data having previously been read and stored in the first page buffer 14 is erased. The output of the data 5 from the first page buffer 14 of the first memory chip 10 is implemented after the output of the data 4 from the fourth page buffer 44 of the fourth memory chip 40 is completed.

In the same manner in which the first to fourth memory chips 10, 20, 30 and 40 operate alternately and cyclically in correspondence to the first to fifth sequential physical addresses TPA<1:5> as described above in such a scheme that 'data is read and stored in a page buffer in a following memory chip while data is outputted from the page buffer of a preceding memory chip', the first to fourth memory chips 10, 20, 30 and 40 operate alternately and cyclically in correspondence to the remaining sixth to eighth, twenty-fifth, twenty-sixth, eleventh and twelfth sequential physical addresses TPA<6:8, 25, 26, 11, 12> in such a scheme that 'data is read and stored in a page buffer in a following memory chip while data is outputted from the page buffer of a preceding memory chip'.

The above-described sequential read operation has a feature in that, since the sequential physical addresses TPA<1:8, 25, 26, 11, 12> mapped to the sequential logical addresses TLA<1:12> are used based on the target table 530, even though the pages 'y' and 'z' corresponding to the twenty-fifth and twenty-sixth sequential physical addresses TPA<25, 26> are in the state in which they are not physically adjacent to the pages a, b, c, d, e, f, g, h, k and l corresponding to the remaining sequential physical addresses TPA<1:8, 11, 12>, it is possible to consecutively read data so long as the predicted read operation does not fail.

In the above-described sequential read operation, because the 12 sequential physical addresses TPA<1:8, 25, 26, 11, 12> are exemplified in such a way as to designate entirely different pages a, b, c, d, e, f, g, h, y, z, k and l, descriptions have not been made for the operation of determining whether an 'overlapped state' has occurred or not, in the course of performing the predicted reading.

In detail, referring to FIG. 68B, if 8 sequential logical addresses TLA<1:8> are inputted in the sequential read operation, the values thereof are searched in the address table 500, conversion is made to 8 sequential physical addresses TPA<1:4, 1, 2, 7, 8>, and the converted sequential physical addresses TPA<1:4, 1, 2, 7, 8> are stored in the target table 530.

Since the process, in which the 8 sequential physical addresses TPA<1:4, 1, 2, 7, 8> may be stored in the target table 530, was described above in detail with reference to FIG. 6A, detailed descriptions thereof will be omitted herein.

Operations in which data are outputted from the memory chips 10, 20, 30 and 40 by using the sequential physical addresses TPA<1:4, 1, 2, 7, 8> stored in the target table 530 will be described below.

First, data 1 stored in the page 'a' of the first memory chip 10 designated by the first sequential physical address TPA<1> mapped to the first sequential logical address TLA<1> is read and stored in the first page buffer 14, and is outputted to the exterior immediately when the reading is completed.

While the operation in which the data 1 is outputted from the first memory chip 10 designated by the first sequential physical address TPA<1> mapped to the first sequential logical address TLA<1> is performed, data 2 stored in the page 'b' of the second memory chip 20 designated by the second sequential physical address TPA<2> mapped to the second sequential logical address TLA<2> is read and stored in the second page buffer 24. Since the second sequential physical address TPA<2> is different from the first sequential physical address TPA<1>, it is determined that an 'overlapped state' has not occurred, and the data 2 of the page 'b' is normally read and stored in the second page buffer 24. The output of the data 2 from the second page buffer 24 of the second memory chip 20 is implemented after the output of the data 1 from the first page buffer 14 of the first memory chip 10 is completed.

While the operation in which the data 2 is outputted from the second memory chip 20 designated by the second sequential physical address TPA<2> mapped to the second sequential logical address TLA<2> is performed, data 3 stored in the page 'c' of the third memory chip 30 designated by the third sequential physical address TPA<3> mapped to the third sequential logical address TLA<3> is read and stored in the third page buffer 34. Since the third sequential physical address TPA<3> is different from the first and second sequential physical addresses TPA<1:2>, it is determined that an 'overlapped state' has not occurred, and the data 3 of the page 'c' is normally read and stored in the third page buffer 34. The output of the data 3 from the third page buffer 34 of the third memory chip 30 is implemented after the output of the data 2 from the second page buffer 24 of the second memory chip 20 is completed.

While the operation in which the data 3 is outputted from the third memory chip 30 designated by the third sequential physical address TPA<3> mapped to the third sequential logical address TLA<3> is performed, data 4 stored in the page 'd' of the fourth memory chip 40 designated by the fourth sequential physical address TPA<4> mapped to the fourth sequential logical address TLA<4> is read and stored in the fourth page buffer 44. Since the fourth sequential physical address TPA<4> is different from the first to third sequential physical addresses TPA<1:3>, it is determined that an 'overlapped state' has not occurred, and the data 4 of the page 'd' is normally read and stored in the fourth page buffer 44. The output of the data 4 from the fourth page buffer 44 of the fourth memory chip is implemented after the output of the data 3 from the third page buffer 34 of the third memory chip 30 is completed.

While the operation in which the data 4 is outputted from the fourth memory chip 40 designated by the fourth sequential physical address TPA<4> mapped to the fourth sequential logical address TLA<4> is performed, data 1 stored in the page 'a' of the first memory chip 10 designated by the first sequential physical address TPA<1> mapped to the fifth sequential logical address TLA<5> should be read and stored in the first page buffer 14. However, the first sequential physical address TPA<1> mapped to the fifth sequential logical address TLA<5> is the same as the first sequential physical address TPA<1> previously mapped to the first sequential logical address TLA<1>. Therefore, it is determined that an 'overlapped state' has occurred, and the data 1 stored in the page 'a' of the first memory chip 10 is not read and stored in the first page buffer 14 and the data 1 previously stored in the first page buffer 14 is retained as it is. The output of the data 1 from the first page buffer 14 of the first memory chip 10 is implemented after the output of the data 4 from the fourth page buffer 44 of the fourth memory chip 40 is completed.

While the operation in which the data 1 is outputted from the first memory chip 10 designated by the first sequential physical address TPA<1> mapped to the fifth sequential logical address TLA<5> is performed, data 2 stored in the page 'b' of the second memory chip 20 designated by the second sequential physical address TPA<2> mapped to the sixth sequential logical address TLA<6> should be read and stored in the second page buffer 24. However, the second sequential physical address TPA<2> mapped to the sixth sequential logical address TLA<6> is the same as the second sequential physical address TPA<2> previously mapped to the second sequential logical address TLA<2>. Therefore, it is determined that an 'overlapped state' has occurred, and the data 2 stored in the page 'b' of the second memory chip 20 is not read and stored in the second page buffer 24 and the data 2 previously stored in the second page buffer 24 is retained as it is. The output of the data 2 from the second page buffer 24 of the second memory chip 20 is implemented after the output of the data 1 from the first page buffer 14 of the first memory chip 10 is completed.

While the operation in which the data 2 is outputted from the second memory chip 20 designated by the second sequential physical address TPA<2> mapped to the sixth sequential logical address TLA<6> is performed, data 7 stored in the page 'g' of the third memory chip 30 designated by the seventh sequential physical address TPA<7> mapped to the seventh sequential logical address TLA<7> is read and stored in the third page buffer 34. Since the seventh sequential physical address TPA<7> is different from the first to fourth sequential physical addresses TPA<1:4>, it is determined that an 'overlapped state' has not occurred, and the data 3 previously stored in the third page buffer 34 is erased and the data 7 of the page 'g' is normally read and stored in the third page buffer 34. The output of the data 7 from the third page buffer 34 of the third memory chip 30 is implemented after the output of the data 2 from the second page buffer 24 of the second memory chip 20 is completed.

While the operation in which the data 7 is outputted from the third memory chip 30 designated by the seventh sequential physical address TPA<7> mapped to the seventh sequential logical address TLA<7> is performed, data 8 stored in the page 'h' of the fourth memory chip 40 designated by the eighth sequential physical address TPA<8> mapped to the eighth sequential logical address TLA<8> is read and stored in the fourth page buffer 44. Since the eighth sequential physical address TPA<8> is different from the first to fourth sequential physical addresses TPA<1:4>, it is determined that an 'overlapped state' has not occurred, and the data 4 previously stored in the fourth page buffer 44 is erased and the data 8 of the page 'h' is normally read and stored in the fourth page buffer 44. The output of the data 8 from the fourth page buffer 44 of the fourth memory chip 40 is implemented after the output of the data 7 from the third page buffer 34 of the third memory chip 30 is completed.

The first to fourth memory chips 10, 20, 30 and 40 operate alternately and cyclically in correspondence with the 8 sequential physical addresses TPA<1:4, 1, 2, 7, 8> as described above in such a scheme that 'data is read and stored in a page buffer in a following memory chip while data is outputted from the page buffer of a preceding memory chip, and whether to proceed a read operation is determined by determining whether data to be read and stored in a page buffer overlaps with the data of a previous data read operation'.

For reference, the operation of determining whether an 'overlapped state' has occurred or not, described above with reference to FIG. 6B, is performed as a matter of course in the example shown in FIG. 6A. However, for the sake of convenience, different examples are used in FIGS. 6A and 6B.

In the above descriptions, the sequential read operation is exemplified in such a way that one unit page is read in one read operation. However, this is only an example, and it is to be noted that the sequential read operation may actually performed in such a way that two units of pages or multiple units of pages are simultaneously read in one read operation according to a designer's choice.

As is apparent from the above descriptions, according to the embodiment, in a sequential read operation, the physical address of subsequent data is calculated in advance and is read and stored in a page buffer during an operation period of reading current data, whereby a reliable read operation may be provided. As a consequence, the performance of read operations may improve, and read disturbance may be prevented.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
   a plurality of memory chips each including memory regions and page buffers;
   an address table suitable for storing mapping information for mapping physical addresses for identifying the memory regions of the plurality of respective memory chips by unit of a physical page and logical addresses for identifying the memory regions of the plurality of respective memory chips by the unit of a logical page;
   a target table suitable for storing sequential physical addresses that are converted from sequential logical addresses through the address table;
   a selective output block suitable for selecting the memory regions of the memory chips as pages under selection by units of a page according to a preset order, based on the sequential physical addresses, and outputting data stored in page buffers of memory chips under selection corresponding to the pages under selection, among the memory chips; and
   an expected read block suitable for reading data stored in selection-expected pages, which is to be selected following the pages under selection according to the preset order in the selective output block, to store in page buffers of selection-expected memory chips corresponding to the selection-expected pages, among the memory chips, while the data stored in the page buffers of the memory chips under selection are outputted.

2. The memory system according to claim 1, wherein the address table updates the mapping information when a data input operation, an erase operation or an error recovery operation is performed in the respective memory chips.

3. The memory system according to claim 2, wherein the sequential logical addresses are searched from the logical addresses stored in the address table, and the target table stores physical addresses mapped to the searched logical addresses, as the sequential physical addresses.

4. The memory system according to claim 3, wherein the target table stores the sequential physical addresses in the preset order based on the sequential logical addresses that are applied in the preset order.

5. The memory system according to claim 4, wherein, while sequential physical addresses, which are searched and converted from sequential logical addresses inputted earlier according to the preset order, are used in the selective output block, sequential logical addresses inputted later according to the preset order are searched and converted into sequential physical addresses in the address table.

6. The memory system according to claim 5,
wherein the selective output block selects one page in any one memory chip among the memory chips, as one of the pages under selection, by using the sequential physical addresses stored in the target table, one by one in the preset order, whenever a selecting operation is performed, and the memory chips are respectively selected once when selecting operations are consecutively performed a first cycle number of times, and
wherein the selective output block performs consecutively the selecting operations a preset number of times corresponding to the preset order, and when the preset number of times is greater than the first cycle number of times, the respective memory chips are selected repeatedly at least once according to the preset order.

7. The memory system according to claim 5,
wherein the selective output block groups at least two pages from each of at least two memory chips among the memory chips and selects the grouped pages as the pages under selection, by using at least two of the sequential physical addresses stored in the target table, in the preset order, whenever a selecting operation is performed, and the memory chips are respectively selected once when selecting operations are consecutively performed a second cycle number of times, and
wherein the selective output block consecutively performs the selecting operations a preset number of times corresponding to the preset order, and when the preset number of times is greater than the second cycle number of times, the respective memory chips are selected repeatedly at least once according to the preset order.

8. The memory system according to claim 5, wherein, when a page under selection is selected by using a sequential physical address corresponding to a first order according to the preset order, the selective output block reads the data stored in the page under selection to store in the page buffer of the memory chip under selection, and outputs the data stored in the page buffer of the memory chip under selection.

9. The memory system according to claim 5, wherein the expected read block comprises:
an expected address selection unit suitable for selecting sequential physical addresses according to an order next to sequential physical addresses being used in the selective output block, among the sequential physical addresses stored according to the preset order, as expected physical addresses; and
a read operation unit suitable for reading the data stored in the selection-expected pages designated by the expected physical addresses, to store in the page buffers of the selection-expected memory chips.

10. The memory system according to claim 9, wherein the expected address selection unit compares values of the expected physical addresses and values of all the sequential physical addresses corresponding to an order before the sequential physical addresses being used in the selective output block, among the sequential physical addresses stored in the target table according to the preset order, and determines whether an overlap occurs.

11. The memory system according to claim 10, wherein, when the values of the expected physical addresses and the sequential physical addresses are determined to be overlapped, the read operation unit retains the data stored in the page buffers of the selection-expected memory chips without reading the data stored in the selection-expected pages designated by the expected physical addresses.

12. The memory system according to claim 11, wherein, when the mapping information is updated in the address table, the read operation unit reads the data stored in the selection-expected pages designated by the expected physical addresses, to store in the page buffers of the selection-expected memory chips, regardless of a determined result of the expected address selection unit.

13. A method for operating a memory system including a plurality of memory chips each having memory regions and page buffers, and an address table storing mapping information for mapping physical addresses and logical addresses for identifying the memory regions of the plurality of respective memory chips by the unit of a physical page and by the unit of a logical page, the method comprising:
storing sequential physical addresses, which are mapped as sequential physical addresses through the address table, in a target table;
selecting the memory regions of the memory chips, as pages under selection, by units of a page according to preset order, based on the sequential physical addresses;
outputting data stored in page buffers of memory chips under selection corresponding to the pages under selection, among the memory chips; and
reading, during the outputting of the data, data stored in selection-expected pages, which is to be selected following the pages under selection according to the preset order in the selecting of the memory regions, to store in page buffers of selection-expected memory chips corresponding to the selection-expected pages, among the memory chips.

14. The method according to claim 13, wherein the address table updates the mapping information when a data input operation, an erase operation or an error recovery operation is performed in the respective memory chips.

15. The method according to claim 14, wherein the storing of the sequential physical addresses comprises:
searching the sequential logical addresses according to the preset order among the logical addresses stored in the address table; and
storing physical addresses mapped to the searched logical addresses, as the sequential physical addresses, according to the preset order.

16. The method according to claim 15, wherein, while sequential physical addresses, which are searched and converted from sequential logical addresses inputted earlier according to the preset order, are used in the selecting of the memory regions, sequential logical addresses inputted later according to the preset order are searched and converted into sequential physical addresses in the address table.

17. The method according to claim 16, wherein, when a page under selection is selected by using a sequential physical address corresponding to a first order according to the preset order, in the outputting of the data, the data stored in the page under selection is read and stored in the page buffer of the memory chip under selection, and the data stored in the page buffer of the memory chip under selection is outputted.

18. The method according to claim 16, wherein the reading of the data comprises:
    selecting sequential physical addresses according to an order next to sequential physical addresses being used in the selecting among the sequential physical addresses stored in the target table according to the preset order, as expected physical addresses; and
    expectedly reading the data stored in the selection-expected pages designated by the expected physical addresses, to store in the page buffers of the selection-expected memory chips.

19. The method according to claim 18, wherein, in the selecting of the sequential physical addresses, values of the expected physical addresses and values of all the sequential physical addresses corresponding to an order before the sequential physical addresses being used in the selective output block among the sequential physical addresses stored in the target table according to the preset order are compared, to determine whether an overlap occurs.

20. The method according to claim 19, wherein the expectedly reading comprises:
    retaining, when the values of the expected physical addresses and the sequential physical addresses are determined to overlap, the data stored in the page buffers of the selection-expected memory chips without reading the data stored in the selection-expected pages designated by the expected physical addresses;
    reading, when the values of the expected physical addresses and the sequential physical addresses are determined not to overlap, the data stored in the selection-expected pages designated by the expected physical addresses is read and stored in the page buffers of the selection-expected memory chips; and
    reading, when the mapping information is updated in the address table, the data stored in the selection-expected pages designated by the expected physical addresses, to store in the page buffers of the selection-expected memory chips, regardless of a determined result.

* * * * *